United States Patent
Geders et al.

[11] Patent Number: 5,927,651
[45] Date of Patent: Jul. 27, 1999

[54] EXPANDABLE FUEL CELL

[75] Inventors: Paul Francis Geders, Florissant; John David Groeneveld, Maryland Heights; Robert Henry Wille, St. Charles, all of Mo.

[73] Assignee: McDonnell Douglas

[21] Appl. No.: 08/856,961

[22] Filed: May 15, 1997

[51] Int. Cl.⁶ .................................................. B64D 37/00
[52] U.S. Cl. ................................. 244/135 B; 244/135 R
[58] Field of Search ........................... 244/135 R, 135 B, 244/119, 120, 130, 133

[56] References Cited

U.S. PATENT DOCUMENTS

| | | | |
|---|---|---|---|
| 2,777,656 | 1/1957 | Clifton | 244/135 B |
| 4,026,503 | 5/1977 | Rhodes | 244/135 B |
| 4,214,721 | 7/1980 | Burhans, Jr. et al. | 244/135 B |
| 4,485,993 | 12/1984 | Mueller | 244/135 B |
| 4,776,537 | 10/1988 | Garside et al. | 244/130 X |
| 4,948,070 | 8/1990 | Lyman | 244/135 B X |
| 5,222,699 | 6/1993 | Albach et al. . | |
| 5,467,889 | 11/1995 | Ashton et al. | 244/135 B X |
| 5,803,405 | 9/1998 | Ellis et al. | 244/130 |
| 5,810,291 | 9/1998 | Geiger et al. | 244/133 |

FOREIGN PATENT DOCUMENTS

| 4-5199 | 1/1992 | Japan | 244/135 B |
|---|---|---|---|

*Primary Examiner*—Charles T. Jordan
*Assistant Examiner*—Theresa M. Wesson
*Attorney, Agent, or Firm*—Dale B. Halling

[57] ABSTRACT

An expandable fuel cell (72) for an aircraft (70) has a flexible structure (126) having a perimeter (124) attached to an airframe of the aircraft (70). The flexible structure (126) has an empty position, in which the flexible structure (126) approximately conforms to a moldline (76) of the aircraft (70), and a full position, in which the flexible structure (126) forms a smooth curvilinear protrusion from the moldline (76) of the aircraft (70). A fuel bladder (152) is positioned between the flexible structure (126) and the airframe.

24 Claims, 9 Drawing Sheets

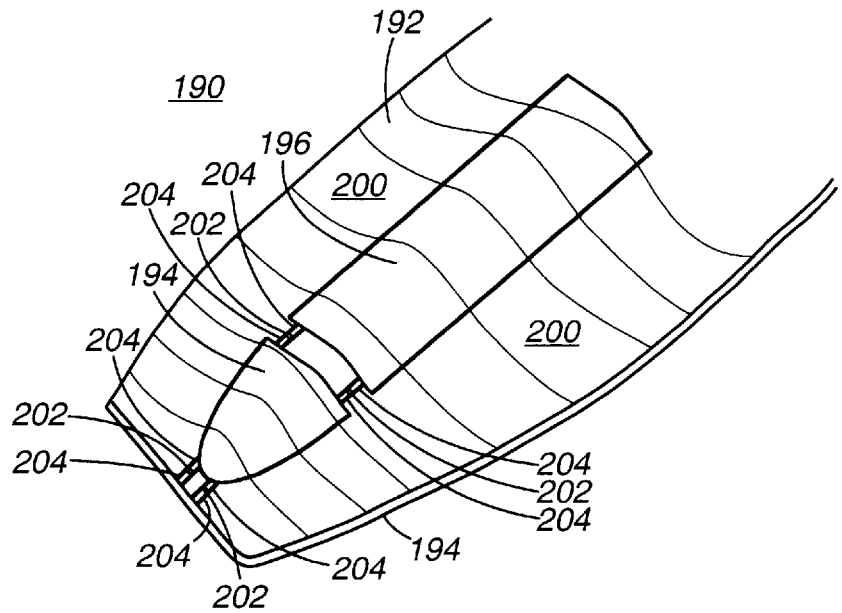
FIG. 11
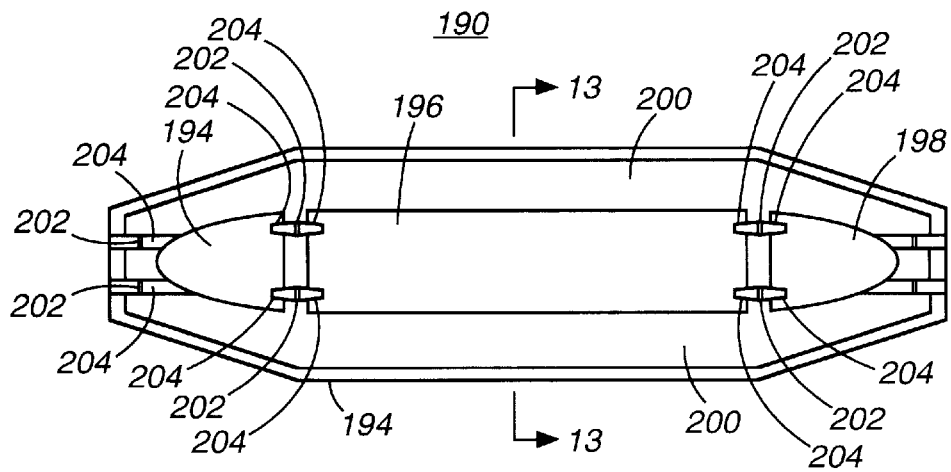
FIG. 12
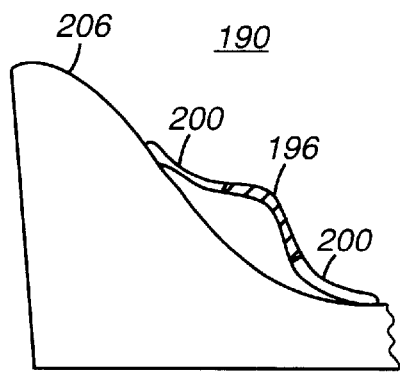 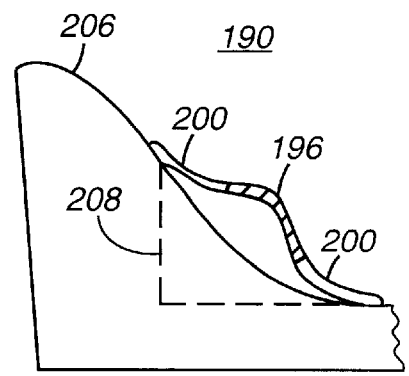
FIG. 13　　　　　FIG. 14

EXPANDABLE FUEL CELL

FIELD OF THE INVENTION

The present invention relates generally to the field of aircraft, and more particularly to an expandable fuel cell for an aircraft.

BACKGROUND OF THE INVENTION

Present tactical aircraft occasionally require more fuel than the internal fuel tanks of the aircraft can carry to perform its mission. These aircraft 50 (see FIG. 1) use external fuel tanks 52 supported by pylons 54 under the fuselage 56 or wings 58. These external fuel tanks 52 contain additional fuel that increases the aircraft's range and duration. Generally, the external fuel tanks 52 are jettisoned in combat. In peacetime, the external fuel tanks 52 are left on the aircraft due to the cost of storage and to reduce logistical problems. However, there are significant aerodynamic performance penalties associated with the carriage of the external fuel tanks 52. Resulting in increased aerodynamic drag and increased operation costs over the lifetime of the aircraft. In addition, the external fuel tank 52 is installed on a weapons pylon 54 reducing the weapons payload that can be carried by the aircraft 50.

Thus there exists a need for an expandable fuel cell that does not significantly increase the aerodynamic drag of the aircraft and does not reduce the weapons payload.

SUMMARY OF THE INVENTION

An expandable fuel cell for an aircraft that overcomes these and other problems has a flexible structure having a perimeter attached to an airframe of the aircraft. The flexible structure has an empty position, in which the flexible structure approximately conforms to a moldline of the aircraft, and a full position, in which the flexible structure forms a smooth curvilinear protrusion from the moldline of the aircraft. A fuel bladder is positioned between the flexible structure and the airframe.

BRIEF DESCRIPTION OF THE DRAWINGS

FIG. 11 is a partial top right perspective view of an embodiment of the external fuel cell shown in FIG. 3;

FIG. 12 is a top view of an embodiment of the external fuel cell shown in FIG. 3;

FIG. 13 is a cross sectional view of the external fuel cell of FIG. 12 in an full position taken along the 13—13 line;

FIG. 14 is a cross sectional view of the external fuel cell of FIG. 12 in an empty position taken along the 13—13 line;

DETAILED DESCRIPTION OF THE DRAWINGS

Figure 1:
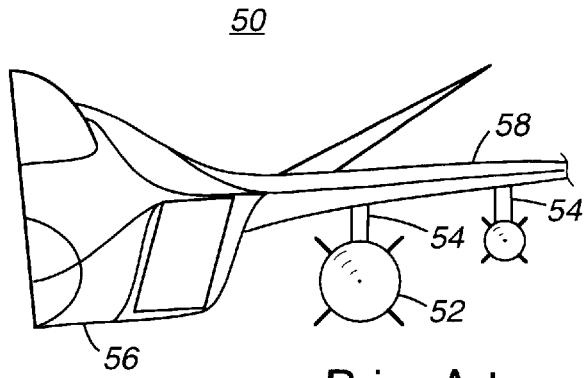
FIG. 1 is a partial front view of an aircraft with a prior art external fuel tank.
Figure 2:
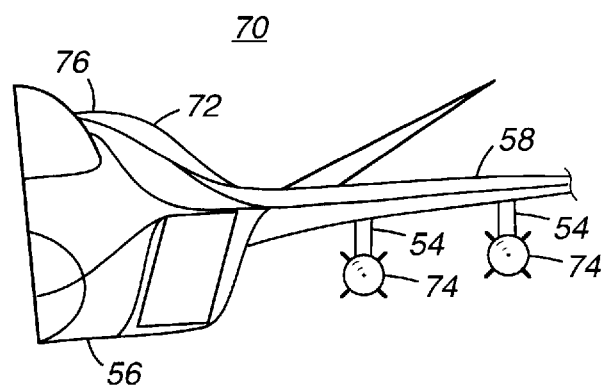
FIG. 2 is a partial front view of an aircraft with an embodiment of external fuel cell according to the invention.
Figure 3:
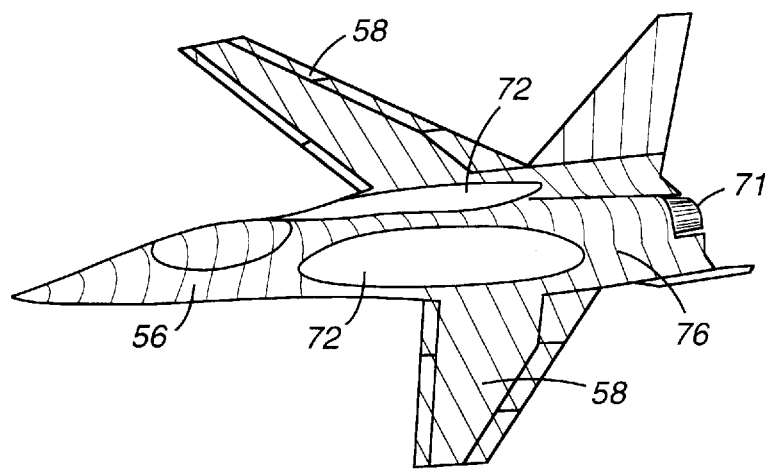
FIG. 3 is a top, right perspective view of the aircraft of FIG. 2.

An aircraft 70 having an engine 71 (see FIG. 3), shown in FIG. 2, shows an embodiment of an expandable fuel cell 72. In this embodiment the expandable fuel cell 72 fits in a shoulder between the fuselage 56 and the wing 58 (see FIG. 3). In another embodiment the expandable fuel cell 72 fits on a wing 58. The expandable fuel cell 72 can be placed in a number of locations on the aircraft 70, however the position shown in FIG. 2 is the preferred location for the type of aircraft shown in FIG. 2. The expandable fuel cell 72 frees up the weapons pylon 54 for additional weapons 74. The expandable fuel cell 72 is formed of a flexible structure that collapses as the contained fuel is used by the aircraft 70. As a result when the expandable fuel cell 72 is in a retracted position (empty position), the expandable fuel cell 72 essentially conforms to a moldline 76 of the aircraft 70. When the expandable fuel cell 72 is in its expanded position (full position), it forms a smooth curvilinear bulge (smooth curvilinear protrusion) that adds minimal subsonic aerodynamic drag to the aircraft 70.

Figure 4:
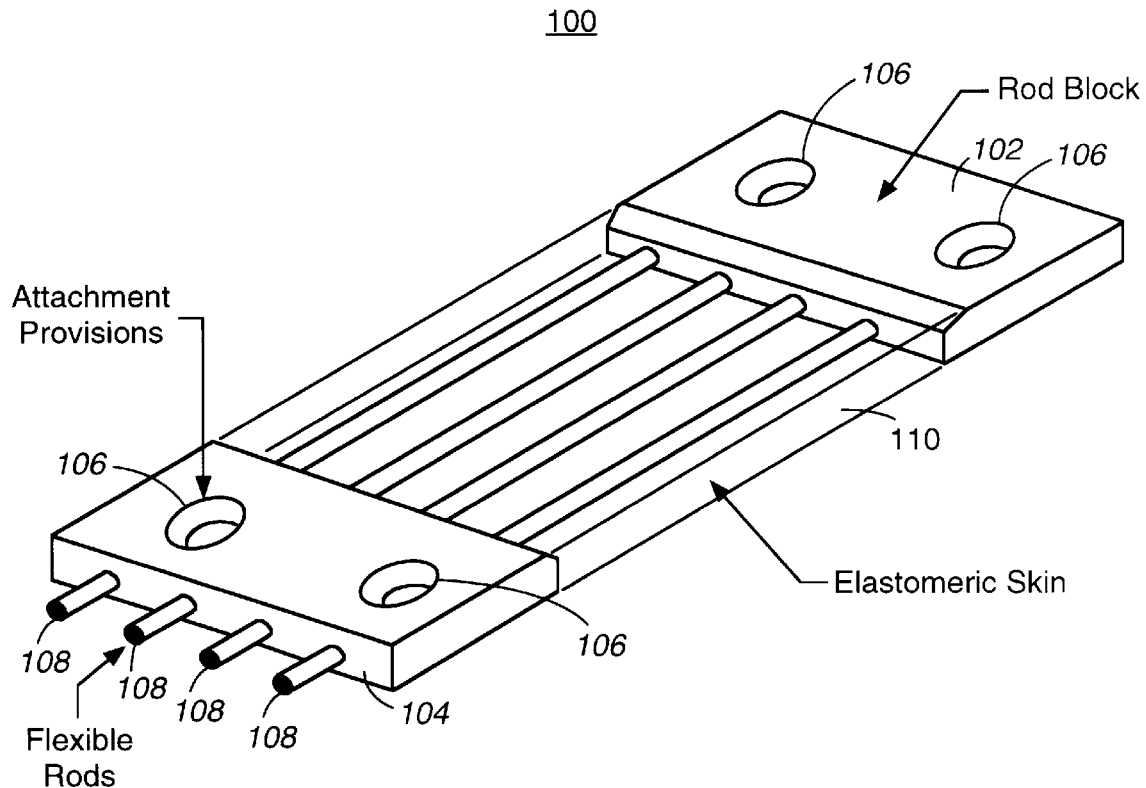
FIG. 4 is a perspective view of a reinforced elastomer panel.

One of the keys to designing an effective external fuel cell is the use of reinforced elastomer panels 100 (see FIG. 4). The reinforced elastomer panel 100 has a pair of rod blocks 102, 104 having attachment provisions 106. The rod blocks are attached to either side of a section requiring expansion and contraction. The reinforced elastomer panel 100 provides a smooth curvilinear surface over the range of motion for the section. A plurality of rods (reinforcing members) 108 are attached to the first rod block 102 and are allowed to slide freely through the second rod block 104. The rods are made of a flexible material such as quartz filled epoxy. An elastomer panel (elastomer skin) 110 is connected between the pair of rod blocks 102, 104. The plurality of rods 108 are allowed to slide freely through the elastomer panel 110. The elastomer panel 110 in one embodiment is made of silicone.

Figure 5:
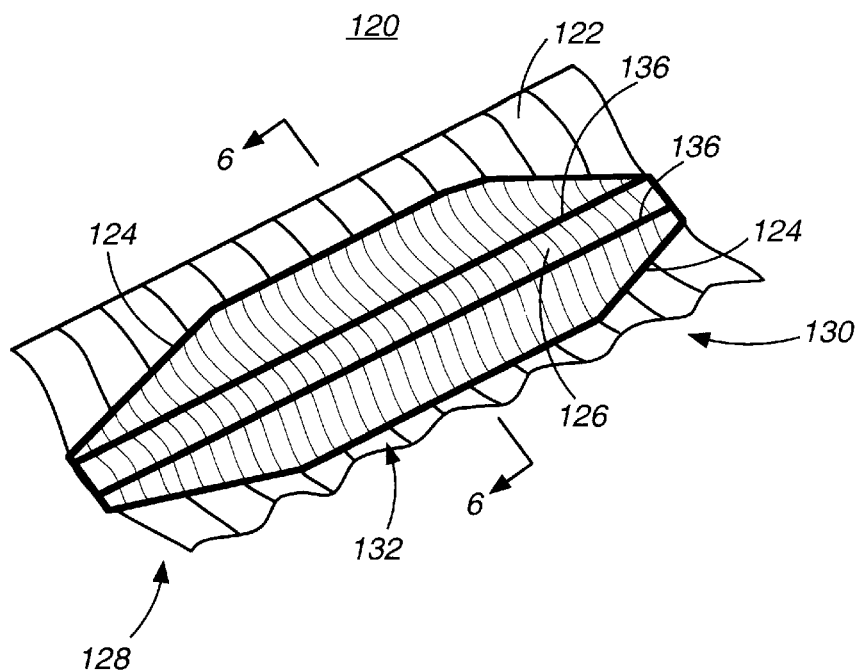
FIG. 5 is a partial perspective view of an embodiment of the external fuel cell shown in FIG. 3.
Figure 6:
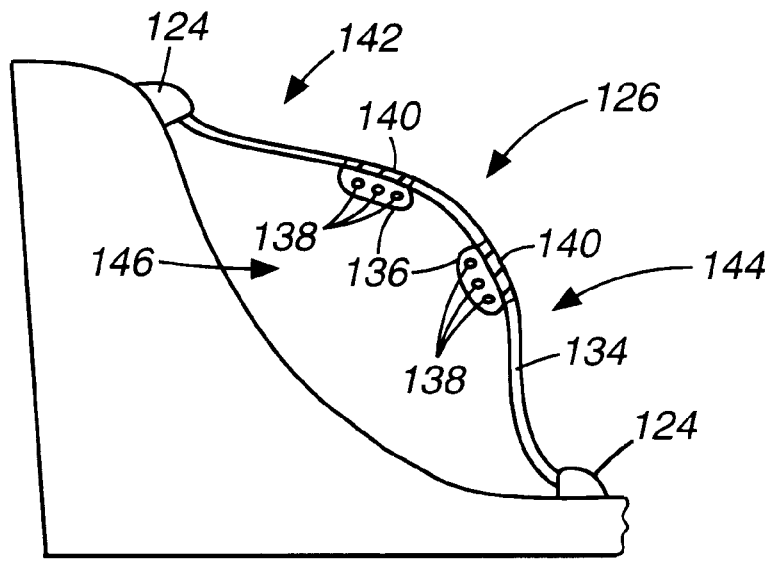
FIG. 6 is a cross sectional view of the external fuel cell of FIG. 5 taken along the 6—6 line.

FIG. 5 is a partial perspective view of an embodiment of an external fuel cell 120. The external fuel cell 120 is formed over a skin 122 of the aircraft. The skin 122 is attached to an airframe of the aircraft. A rigid perimeter 124 defines the shape of the external fuel cell 120. The perimeter contains a reinforced elastomer structure 126 having a tapered leading edge 128, a tapered trailing edge 130 and a connecting center section 132. In this embodiment, the reinforced elastomer structure 126 consists of a large reinforced elastomer panel 134 (see FIG. 6) with a pair of struts 136 running longitudinally along the external fuel cell 120. The struts 136 consist of a plurality of rods 138 contained in a flexible material. The plurality of rods 138, in one embodiment, are made of the same material as the reinforcing rods in the reinforced elastomer panel 134.

The reinforcing rods in the reinforced elastomer panel 134 are stationwise (perpendicular to the struts 136). The reinforcing rods meet in a pair of collars 140 centered over the struts 136. The collars 140 are made of rigid material and allow the reinforcing rods along a top section 142 and a bottom section 144 to slide freely within guides as the expandable fuel cell 120 expands and contracts. The reinforcing rods in the center section 146 are attached to one of the collars 140 and slide freely within the other collar 140.

Figure 7:
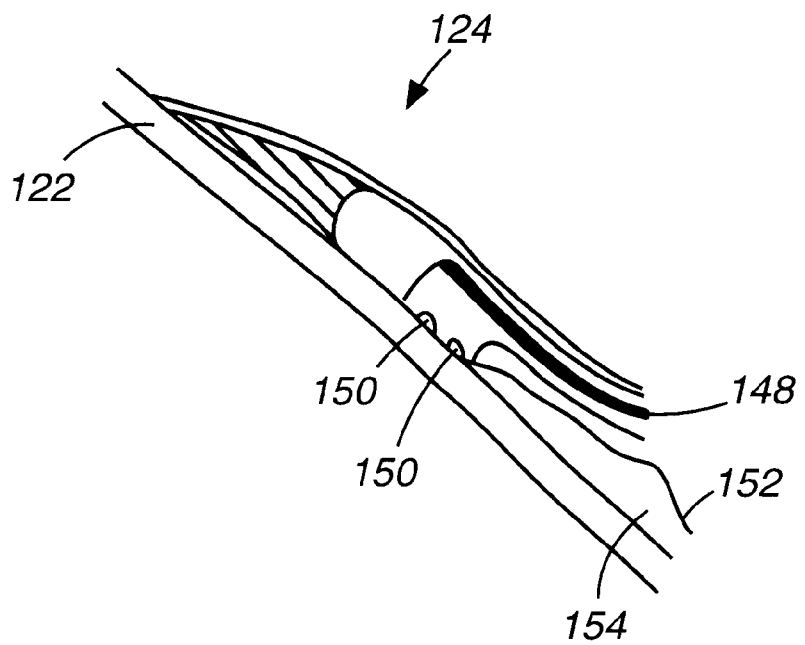
FIG. 7 is a partial expanded view of a perimeter of the external fuel cell of FIG. 6.

FIG. 7 shows how the rigid perimeter 124 and the collapsible fuel cell bladder of the expandable fuel cell works. The perimeter 124 in one embodiment is made of a rigid composite and is attached to the airframe of the aircraft. The perimeter 124 mates with the skin 122 to form a smooth curvilinear transition between the skin 122 and the expandable fuel cell 120. The reinforcing rods 148 are attached to the perimeter 124. In addition, the perimeter has a pair of fuel seals 150. The fuel seals 150 contain an O-ring over which a fuel liner 152 is fitted. The skin 122 of the aircraft is coated with a fuel-proof coating, such a polyurethane. The fuel 154 is then contained between the fuel-proof coating and the fuel liner 152, thus forming a collapsible fuel cell bladder. The collapsible fuel cell bladder in another embodiment is a bag made of standard fuel liner material. All the other embodiments of the expandable fuel cells discussed herein are designed to use a similar, perimeter 124 and fuel cell bladder 150, 152. For conciseness, the perimeter (perimeter rigid block) 124 and fuel cell bladder 150, 152 are not discussed or shown in detail in the following figures.

Figure 8:
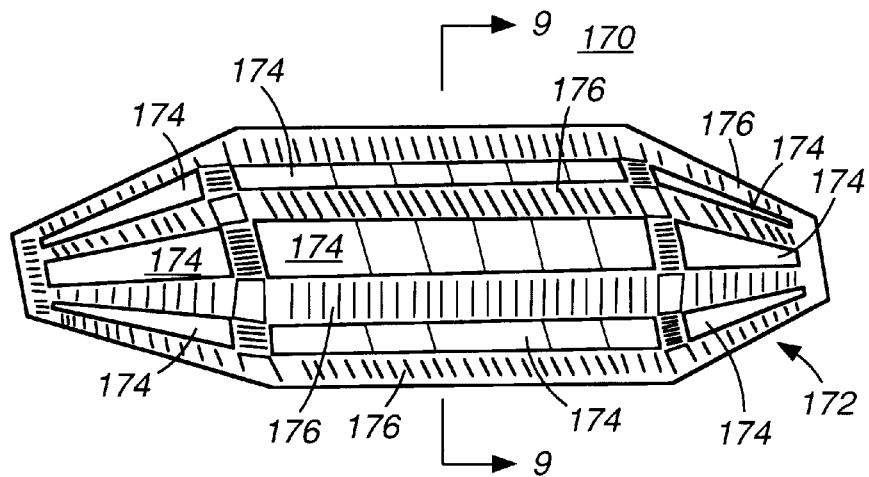
FIG. 8 is a top view of an embodiment of the external fuel cell shown in FIG. 3.
Figure 9:
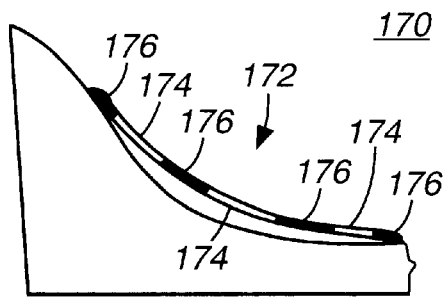
FIG. 9 is a cross sectional view of the external fuel cell of FIG. 8 in an empty position taken along the 9—9 line.
Figure 10:
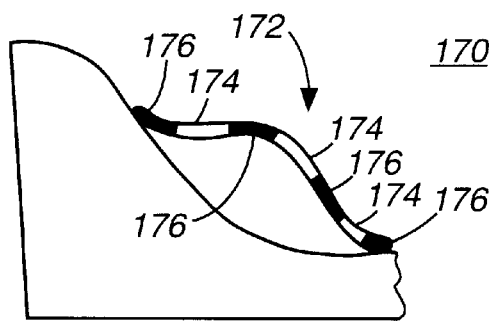
FIG. 10 is a cross sectional view of the external fuel cell of FIG. 8 in an full position taken along the 9—9 line.

FIGS. 8–10 show another embodiment of an expandable fuel cell 170. In this embodiment, the flexible structure 172 has nine rigid plates 174 interconnected by a series of reinforced elastomer panels 176. The arrangement of the reinforcing rods is shown by the white lines in the black of the reinforced elastomer panel 176. The nine rigid panels (plurality of rigid panels) 174 in one embodiment are a composite. In another embodiment the rigid panels aluminum lay-up plates. In this embodiment and the embodiment shown in FIGS. 5–7, the flexible structure 172 is naturally in the retracted position shown in FIG. 9. The flexible structure 172 expands under the pressure of fuel inserted into the collapsible fuel cell bladder to the expanded position (full position) shown in FIG. 10. The flexible structure retracts automatically as the fuel is consumed. As a result, a volume of the expandable fuel cell (smooth curvilinear bulge) is directly proportional to a fuel volume in the collapsible fuel cell bladder.

FIG. 11 shows a perspective view of another embodiment of expandable flexible fuel cell 190. An elastomer structure 192 is contained by a perimeter 194. In this embodiment the concave rigid panels 194–198 (see FIGS. 12–14) are connected to the perimeter by elastomer panels 200. The rigid panels 194–198 are connected to each other by sliding pivoting mechanisms 202 at the ends of rigid straps 204. FIG. 13 shows a cross section of the expandable fuel cell 190 in an expanded position. FIG. 14 shows the expandable fuel cell 190 in a retracted position. Unlike the previous embodiments, the expandable fuel cell 190 does not entirely collapse against the moldline 206 in the retracted position. As a result some volume is always enclosed by the expandable fuel cell 190. In one embodiment the expandable fuel cell 190 is part of internal fuel cell 208 (integral) shown in dashed lines. In another embodiment the expandable fuel cell 190 is parasitic and connects to an internal fuel cell through a fuel line (see FIG. 19 for more details). All the embodiments discussed in herein can be either parasitic or integral.

Figure 15:
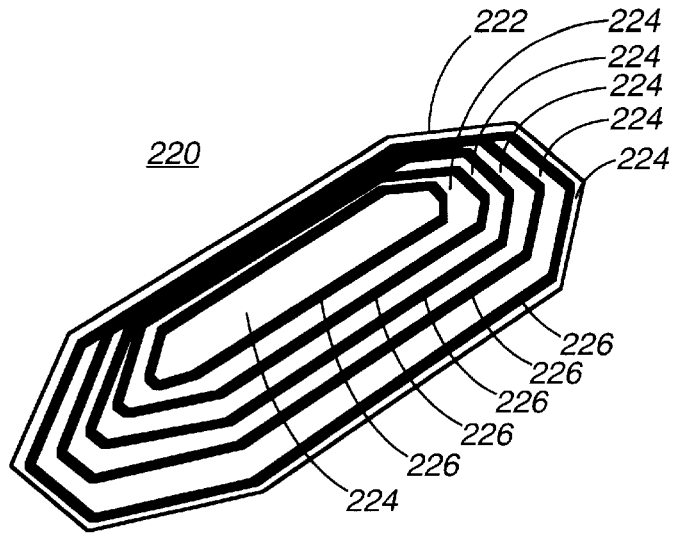
FIG. 15 is a top right perspective view of an embodiment of the external fuel cell shown in FIG. 3.
Figure 16:
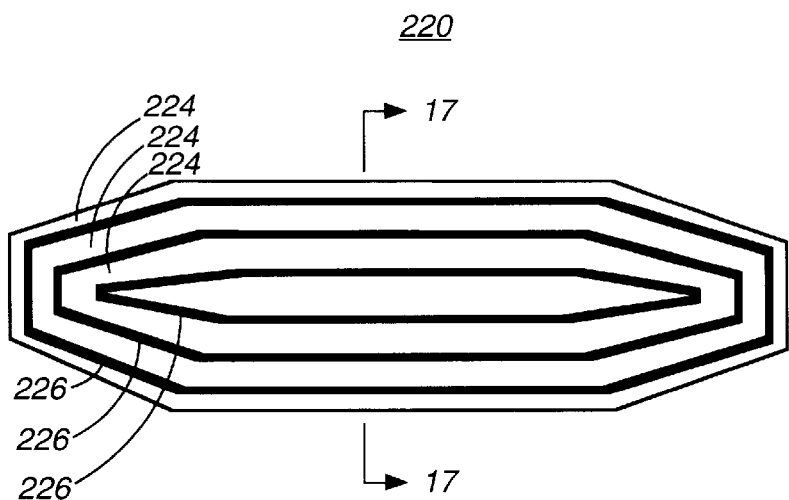
FIG. 16 is a top view of an embodiment of the external fuel cell shown in FIG. 3.
Figure 17:
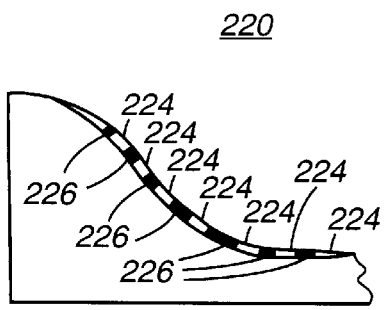
FIG. 17 is a cross sectional view of the external fuel cell of FIG. 16 in a retracted position taken along the 17—17 line.
Figure 18:
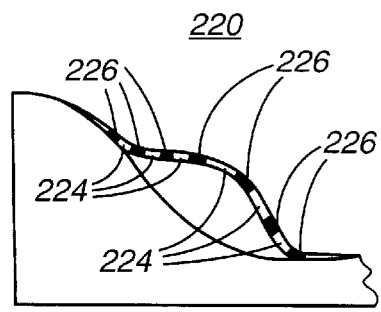
FIG. 18 is a cross sectional view of the external fuel cell of FIG. 16 in an expanded position taken along the 17—17 line.

FIG. 15 is a perspective view of another embodiment of an expandable fuel cell 220. A flexible structure 222 has a plurality of rigid panels 224 connected together by a plurality of reinforced elastomer panels (reinforced elastomer sheet) 226 (shown in black). FIG. 16 is a top view of the expandable fuel cell 220. The retracted position and expanded position of the expandable fuel cell 220 are shown in FIGS. 17 and 18 respectively.

Figure 19:
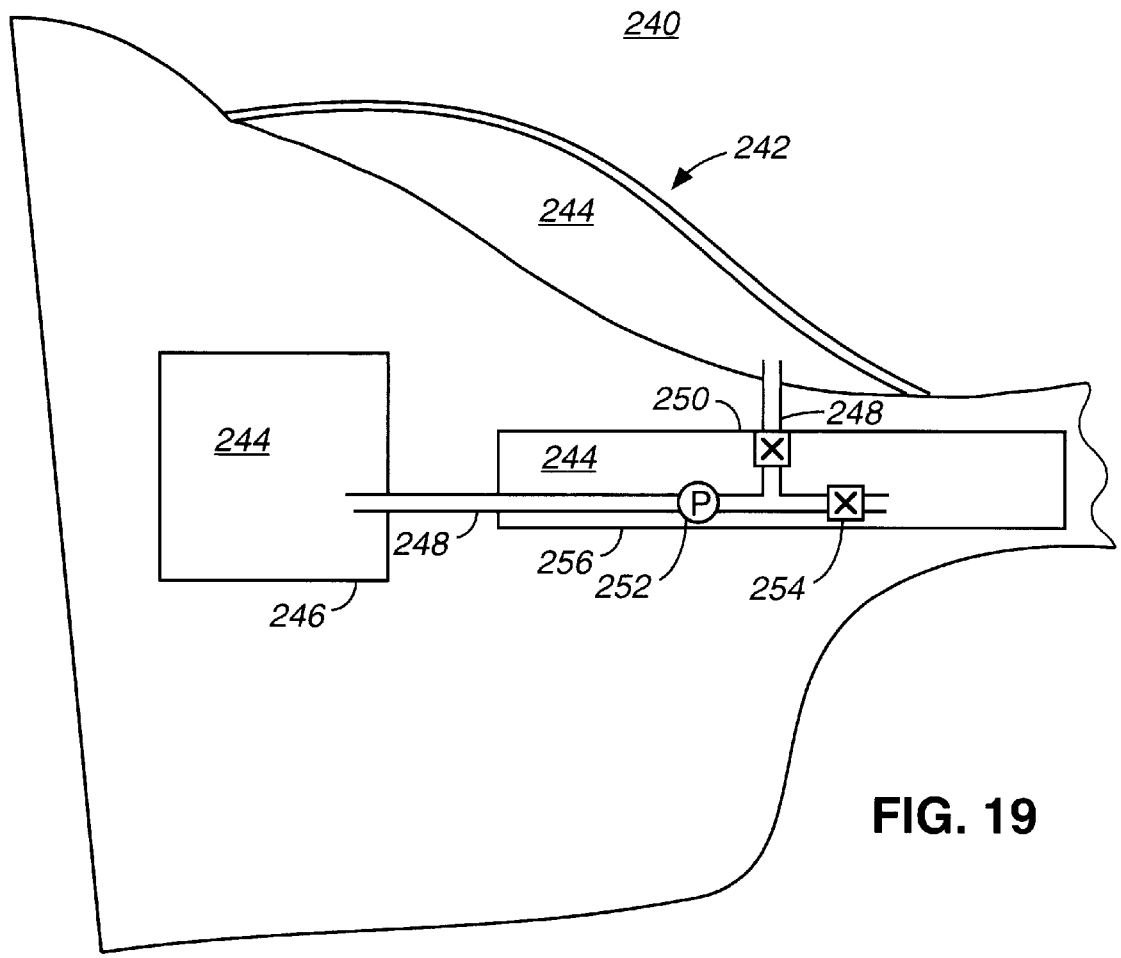
FIG. 19 is a schematic diagram of an embodiment of the external fuel cell according to the invention.

FIG. 19 is a schematic diagram of a parasitic expandable fuel cell system 240. The expandable fuel cell 242 contains fuel 244 and is connected to an internal fuel tank 246 by a fuel line 248. A valve 250 can be opened and a pump 252 used to pump fuel into the internal fuel tank 246. A second valve 254 can be opened to pump fuel from an internal wing tank 256 to the internal tank 246. When the expandable fuel cell 242 is in the retracted position the internal fuel tank 246 has a volume equal to a standard fuel payload.

Figure 20:
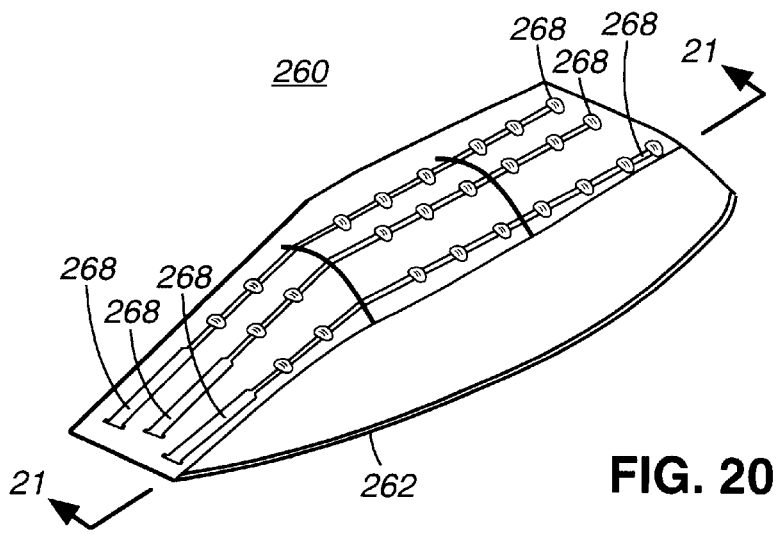
FIG. 20 is a partial top right perspective view of an embodiment of the external fuel cell shown in FIG. 3.
Figure 21:
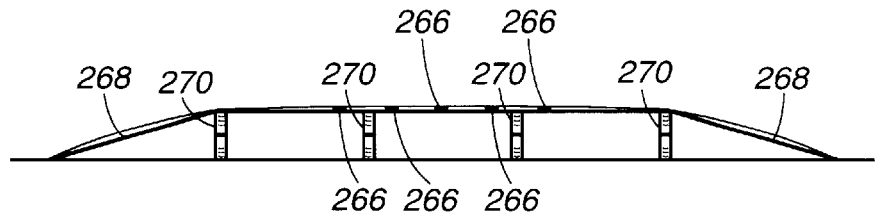
FIG. 21 is a cross sectional view of external fuel cell of FIG. 20 in an expanded position, taken along the 21—21 line.
Figure 22:
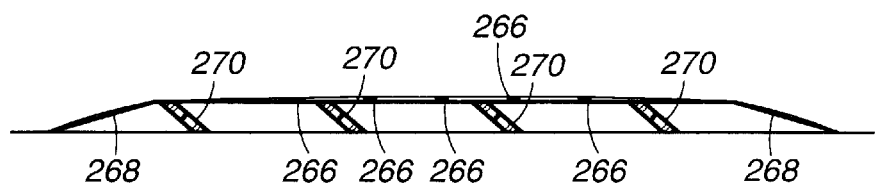
FIG. 22 is a cross sectional view of external fuel cell of FIG. 20 in a retracted position, taken along the 21—21 line.

FIGS. 20–22, FIGS. 23–24 and FIGS. 25–26 represent three embodiments of an expandable fuel cell having a skeletal structure (rigid skeleton, structural skeleton). FIG. 20 shows a partial perspective of an embodiment of an expandable fuel cell 260. In this embodiment the flexible structure 262 is held in place by a skeletal structure 264. The skeletal structure 264 is connected to the flexible structure 262 by a plurality of attachment points 266. In this embodiment the flexible structure 262 is a sheet of reinforced elastomer panel. The skeletal structure 264 has a plurality of longitudinal ribs 268 and a plurality of intersecting vertical ribs 270, see FIGS. 21 and 22. The vertical ribs 270 are allowed to pivot and the longitudinal ribs 268 are allowed to slide along its edge. The ribs are made of light weight rigid material, such as composite. In this embodiment, the skeletal structure 264 is passive.

Figure 23:
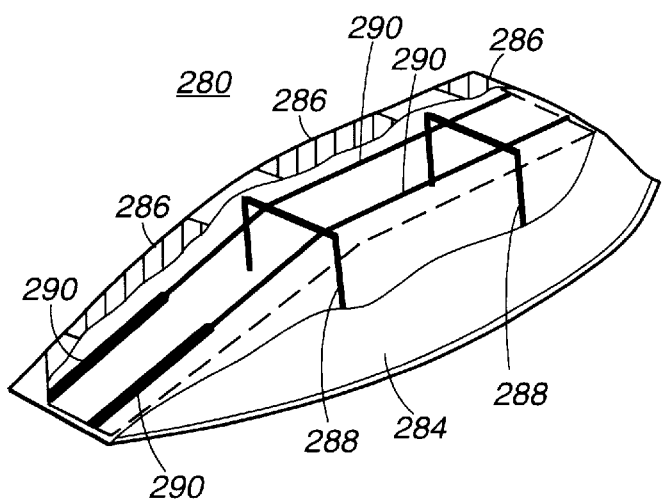
FIG. 23 is a partial top right perspective view of an embodiment of the external fuel cell in an expanded position.
Figure 24:
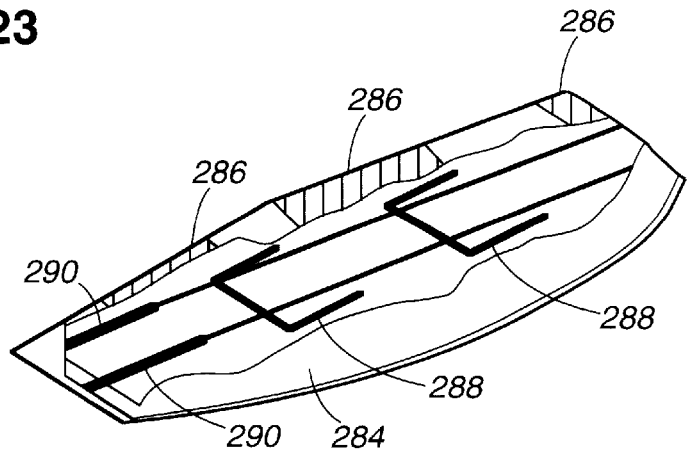
FIG. 24 is a partial top right perspective view of the external fuel cell of FIG. 23 in a retracted position.

FIGS. 23 and 24 show an embodiment of an expandable fuel cell 280 in which the skeletal structure 282 can be either passive or actuated. The flexible structure 284 has a plurality of rigid panels 286 connected together by reinforced elastomer panels. The skeletal system has a plurality of pivoting ribs 288. The ribs 288 can be actuated by a rotary actuation mechanism at its pivot points. A pair of struts 290 run parallel to the ribs 288. The struts 290 are pivotally connected to the ribs 288. The struts 290 slide along the perimeter guides as the expandable fuel cell 280 expands (FIG. 23) and contracts (FIG. 24).

Figure 25:
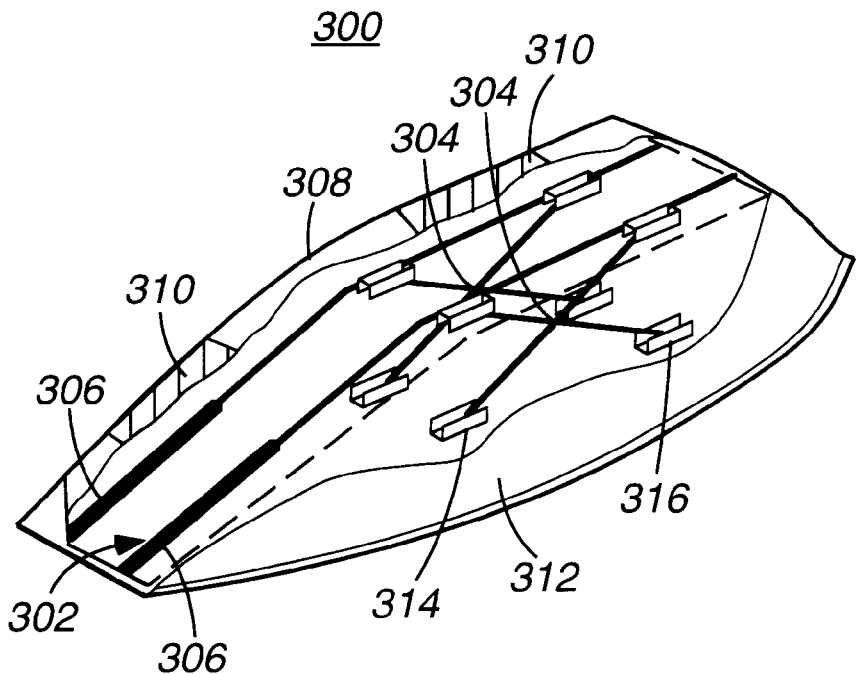
FIG. 25 is a partial top right perspective view of an embodiment of the external fuel cell in an expanded position.
Figure 26:
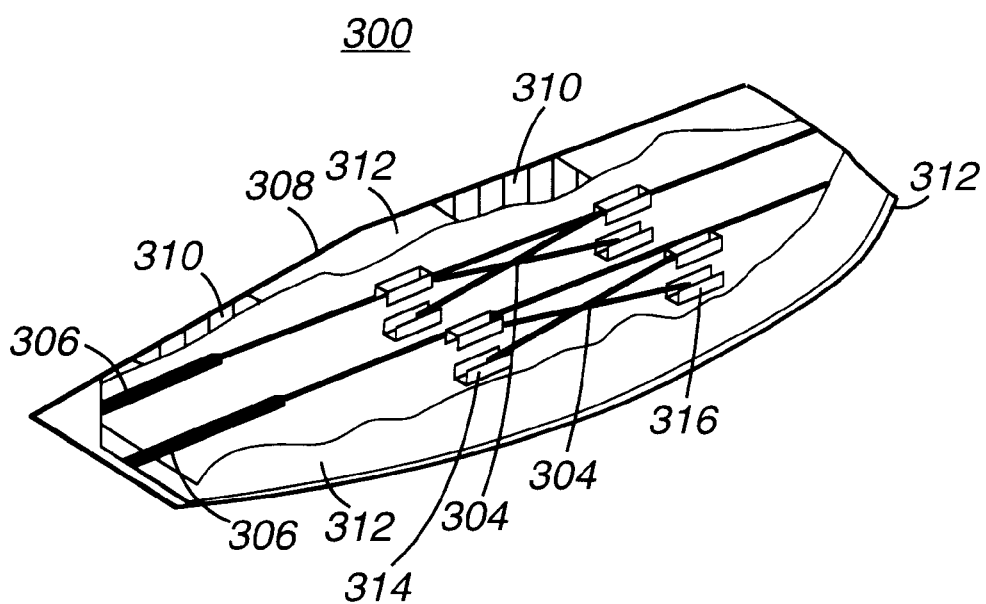
FIG. 26 is a partial top right perspective view of the external fuel cell of FIG. 25 in a retracted position.

FIGS. 25 and 26 show another embodiment of an expandable fuel cell 300 with a skeletal structure 302. This embodiment can have either an actuated or a passive skeletal design. The skeletal structure 302 consists of X shaped expansion members 304 connected to longitudinal struts 306. The flexible structure 308 has a plurality of rigid surfaces 310 connected together by reinforced elastomer panels 312. The X shaped expansion members 304 can be actuated by pushing one of the feet 314 longitudinally and only allowing the other foot 316 to pivot.

Thus there has been described an expandable fuel cell that significantly reduces the aerodynamic drag associated with external fuel tanks. In addition, the expandable fuel cell does not reduce the weapons payload that can be carried by the aircraft. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An expandable fuel cell for an aircraft, comprising:

a collapsible fuel cell bladder; and a reinforced elastomer structure covering the collapsible fuel cell bladder, the reinforced elastomer structure having a tapered leading edge, a tapered trailing edge, and a connecting center section, the reinforced elastomer structure having a perimeter attached to an airframe of the aircraft, the reinforced elastomer structure having a retracted position conforming substantially to a moldline of the aircraft and continuously expanding to a full position, in which the reinforced elastomer structure forms a smooth curvilinear bulge in the moldline of the aircraft.

2. The expandable fuel cell of claim 1, wherein the reinforced elastomer structure comprises a plurality of reinforced elastomer panels connected to a plurality of rigid panels.

3. The expandable fuel cell of claim 1, wherein the perimeter of the reinforced elastomer structure is attached to a fuselage of the aircraft.

4. The expandable fuel cell of claim 1, wherein a volume of the smooth curvilinear bulge is directly proportional to a fuel volume in the collapsible fuel cell bladder.

5. The expandable fuel cell of claim 1, wherein the reinforced elastomer structure comprises a reinforced elastomer sheet, a perimeter rigid block attached to the reinforced elastomer sheet, and a longitudinal strut attached to the reinforced elastomer sheet.

6. The expandable fuel cell of claim 1, further including a rigid skeleton between the collapsible fuel cell bladder and the reinforced elastomer surface.

7. The expandable fuel cell of claim 1, wherein the collapsible fuel cell bladder has a fuel liner attached to the perimeter.

8. The expandable fuel cell of claim 7, wherein the collapsible fuel cell bladder includes a fuel-proof coating applied to a skin of the aircraft.

9. The expandable fuel cell of claim 8, wherein the fuel coating is a polyurethane.

10. An expandable fuel cell for an aircraft, comprising:

a flexible structure having a perimeter attached to an airframe of the aircraft, the flexible structure having an empty position, in which the flexible structure approximately conforms to a moldline of the aircraft, and a full position, in which the flexible structure forms a smooth curvilinear protrusion from the moldline of the aircraft; and a fuel bladder positioned between the flexible structure and the airframe.

11. The expandable fuel cell of claim 10, wherein the flexible structure comprises a reinforced elastomer panel attached to a rigid plate.

12. The expandable fuel cell of claim 11, further including a structural skeleton between the flexible structure and the fuel bladder.

13. The expandable fuel cell of claim 12, wherein the flexible structure is attached to a wing of the aircraft.

14. The expandable fuel cell of claim 13, further including a fuel line connected between the fuel bladder and an internal fuel tank.

15. The expandable fuel cell of claim 14, further including a pump attached to the fuel line.

16. The expandable fuel cell of claim 10, wherein the perimeter is a rigid material that attaches to an airframe of the aircraft and mates with a skin of the aircraft.

17. The expandable fuel cell of claim 16, wherein the perimeter includes a fuel seal that mates with the collapsible fuel cell bladder.

18. An expandable fuel cell for an aircraft comprising:

a fuel liner; and an elastomer structure having a perimeter attached to the airframe and mating with the fuel liner, the elastomer structure having a retracted position in which the elastomer structure approximately conforms to a moldline of the aircraft and the elastomer structure having a full position in which the elastomer structure forms a smooth curvilinear bulge on the moldline of the aircraft.

19. The expandable fuel cell of claim 18, wherein a volume contained between the fuel liner and the elastomer structure in the retracted position is equal to a standard fuel payload.

20. The expandable fuel cell of claim 19, wherein the elastomer structure has a reinforced elastomer sheet connected to a strut.

21. The expandable fuel cell of claim 19, further including a skeletal structure supporting the elastomer structure.

22. The expandable fuel cell of claim 21, wherein the elastomer structure comprises a reinforced elastomer panel attached to a rigid plate.

23. The expandable fuel cell of claim 22, wherein the rigid plate is concave.

24. An aircraft, comprising:

a fuselage;

an engine attached to the fuselage;

a pair of wings attached to the fuselage; and an expandable fuel cell connected to the wing wherein the expandable fuel cell has fuel liner and an elastomer structure having a perimeter attached to the airframe and mating with the fuel liner, the elastomer structure having a retracted position in which the elastomer structure approximately conforms to a moldline of the aircraft and the elastomer structure having a full position in which the elastomer structure forms a smooth curvilinear bulge on the moldline of the aircraft.

* * * * *